US006625397B2

United States Patent
Nagata

(10) Patent No.: US 6,625,397 B2
(45) Date of Patent: Sep. 23, 2003

(54) AUXILIARY LIGHT EMITTING DEVICE

(75) Inventor: Keiji Nagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,630

(22) Filed: May 30, 2001

(65) Prior Publication Data

US 2002/0003958 A1 Jan. 10, 2002

(30) Foreign Application Priority Data

May 30, 2000 (JP) ........................................ 2000-160079

(51) Int. Cl.$^7$ ............................ G03B 15/02; G03B 3/10
(52) U.S. Cl. ........................................ 396/106; 396/122
(58) Field of Search ................................ 396/102, 106, 396/111, 121, 122

(56) References Cited

U.S. PATENT DOCUMENTS

| | | | | |
|---|---|---|---|---|
| 5,459,551 A | | 10/1995 | Suzuki et al. | 354/403 |
| 5,579,079 A | | 11/1996 | Yamada et al. | 396/51 |
| 5,696,998 A | | 12/1997 | Yamada et al. | 396/51 |
| 5,771,413 A | | 6/1998 | Suda et al. | 396/114 |
| 5,839,001 A | | 11/1998 | Ohtaka et al. | 396/114 |
| 5,864,721 A | | 1/1999 | Suda et al. | 396/114 |
| 5,870,637 A | * | 2/1999 | Sensui | 396/109 |
| 6,009,280 A | * | 12/1999 | Akamatsu et al. | 396/121 |
| 6,085,042 A | * | 7/2000 | Yamamoto | 396/121 |
| 6,366,736 B1 | * | 4/2002 | Nonaka | 396/106 |
| 6,430,370 B1 | * | 8/2002 | Nonaka | 396/89 |

* cited by examiner

Primary Examiner—Russell Adams
Assistant Examiner—Arthur Smith
(74) Attorney, Agent, or Firm—Fitzpatrick, Cella, Harper & Scinto

(57) ABSTRACT

A focus detecting device having an auxiliary light mode, in which, when a focus is not appropriately first detected, a focus detecting operation for detecting the focus is executed with auxiliary light being projected. The focus detecting device includes a plurality of focus detecting areas, a detecting device for detecting a focus in each of the plurality of focus detecting areas, and a determination circuit for determining whether or not the focus detecting operation is to be executed in the auxiliary light mode based on the detected focus and a determination criterion, wherein the determination criterion is set to a predetermined value according to at least one of the plurality of focus detecting areas. Further, the focus detecting areas may be divided into groups each having at least two focus detecting areas, and the determination criterion can be set to a different predetermined value for each of the groups.

32 Claims, 16 Drawing Sheets

AUXILIARY LIGHT EMITTING DEVICE

BACKGROUND OF THE INVENTION

1. Field of the Invention

The present invention relates to a focus detecting device employing a so-called passive auto-focus ("AF") system (system for detecting a focus by light from a subject) such as a phase detection system, a contrast detecting system, and the like mounted on a photographing apparatus such as a camera, video camera, and the like and on various observing apparatuses, and more particularly, to a focus detecting device permitting auxiliary light to be projected effectively in the passive AF system.

2. Description of the Related Art

FIG. 15 shows an example of a camera to which a conventional focus detecting device is assembled. In FIG. 15, reference numeral 100 denotes an auxiliary light emitting device, reference numeral 101 denotes an objective lens for taking a picture, reference numeral 102 denotes a semi-transparent main mirror, reference numeral 103 denotes a focusing plate, reference numeral 104 denotes a pentaprism, reference numeral 105 denotes an eyepiece, reference numeral 106 denotes a sub-mirror, reference numeral 107 denotes a film, and reference numeral 108 denotes a focus detecting device, respectively. In FIG. 15, light beams coming from a subject (not shown) are reflected by the main mirror 102 upward after they pass through the objective lens 101 and form an image on the focusing plate 103. The image formed on the focusing plate 103 is visually confirmed by a photographer or an observer through the eyepiece 105 after it is reflected by the pentaprism 104 a plurality of times.

In contrast, some light beams having reached the main mirror 102 from the objective lens 101 partly pass through the main mirror 102 and are reflected downward by the sub-mirror 106 and introduced to the focus detecting device 108.

FIG. 16 is a view in which only the objective lens 101 and the focus detecting device 108 of FIG. 15 are illustrated to explain a principle of focus detection.

In the interior of the focus detecting device 108 of FIG. 16, reference numeral 109 denotes field of view masks disposed at positions near to a scheduled focusing surface of the objective lens 101, that is, near to a surface conjugate with a film surface, reference numeral 110 denotes a field lens similarly disposed in the vicinity of the scheduled focusing surface, reference numeral 111 denotes a secondary imaging system composed of two lenses 111-1 and 111-2, reference numeral 112 denotes a photoelectric conversion element including two sensor rows 112-1 and 112-1 and disposed in correspondence to the two lenses 111-1 and 111-2 there behind, reference numeral 113 denotes a diaphragm including two openings 113-1 and 113-2 disposed in correspondence to the two lenses 111-1 and 111-2, and reference numeral 114 denotes a projecting pupil of the objective lens 101 including two divided regions 114-1 and 114-2, respectively. Note that the field lens 110 has an action for imaging the openings 113-1 and 113-2 of the diaphragm 113 in the vicinity of the regions 114-1 and 114-2 of the projecting pupil 114 of the objective lens 101, so that light beams 115-1 and 115-2 having passed through the respective regions 114-1 and 114-2 form distributed quantities of light in the two sensor rows 112-1 and 112-2, respectively.

The focus detecting device 108 employs a so-called phase difference detecting system arranged such that when an imaging point of the objective lens 101 is located forward of the scheduled focusing surface, that is, on the objective lens 101 side, the distributed quantities of light formed on the two sensor rows 112-1 and 112-2, respectively, are separated from each other. Moreover, an amount of deviation of the distributed quantities of light formed on the two sensor rows 112-1 and 112-2 has a certain functional relationship with an amount of defocus of the objective lens 101, that is, with an amount out of focus. Thus, when the amount of deviation is calculated by an appropriate calculation unit, an out of focus direction and amount of the objective lens 101 can be detected.

Further, to cope with conditions under which a focus cannot be detected accurately or cannot be detected at all because a subject is dark or has a low contrast, a camera having an auxiliary light emitting device mounted thereon or built therein is proposed to illuminate the subject or to project a pattern having a contrast onto the subject.

FIG. 17 is a view showing an arrangement of an ordinary auxiliary light emitting device, wherein light from a light emission unit 116 illuminates a pattern 117 and a light projection lens 118 for projecting the pattern 117 onto a subject is protected by a protection plate 119.

FIG. 18 shows a pattern image 120 formed on the subject by the pattern 117.

A camera having a focus detecting device assembled thereto cannot detect a focus when a subject has a low degree of luminance. Thus, detection of a focus is made possible in a subject having a low degree of luminance by increasing a contrast of the subject by illuminating the subject or projecting a pattern thereto by an auxiliary light emitting device. However, a focus detecting capability in a low degree of luminance greatly depends upon determination conditions for determining whether or not auxiliary light is to be emitted because auxiliary light (i) may be wastefully projected without any sufficient effect, or (ii) may not be emitted regardless of whether an increase in a focus detecting accuracy could be expected, depending upon a reflectance of a subject, a state of a background, and a focus detecting capability of a focus detecting device.

Recently, the number of focus detecting points has been increased and a focus detecting region has been enlarged. Accordingly, when a determination criterion for determining whether or not auxiliary light is to be projected is uniformly set in a focus detecting device having a plurality of focus detecting points, a problem arises in that wasteful projection of auxiliary light is more and more increased and that no auxiliary light is projected regardless of whether an increase of a focus detecting accuracy could be expected thereby because respective focus detecting points are located at different positions on a subject and focus detecting capabilities are different at the respective focus detecting points.

SUMMARY OF THE INVENTION

The present invention, in one aspect, is directed to an auxiliary light emitting device for a focus detecting device for emitting an auxiliary light, the focus detecting device having, a screen divided into a plurality of regions and a plurality of focus detecting areas respectively disposed on the plurality of regions, the focus detecting device respectively detecting a focus of a subject in the plurality of focus detecting areas. The auxiliary light emitting device comprises a determination circuit for determining whether the auxiliary light is to be emitted based on a determination reference value, and setting means for setting the determination reference value to a predetermined value according to a position of at least one of the plurality of focus detecting areas.

In another aspect, the present invention is directed to an auxiliary light emitting device for a focus detecting device for emitting an auxiliary light, the focus detecting device having a screen divided into a plurality of regions and a plurality of focus detecting areas respectively disposed on the plurality of regions, the focus detecting device respectively detecting a focus of a subject in the plurality of focus detecting areas. The auxiliary light emitting device comprises a selection circuit for selecting at least one of the plurality of focus detecting areas, and a setting circuit for setting an auxiliary light emission determination value to a predetermined value in accordance with the at least one focus detecting area selected by the selection circuit, the auxiliary light emission determination value being a criterion for determining whether the auxiliary light is to be emitted.

In yet another aspect, the present invention is directed to a focus detecting device. The focus detecting device comprises a plurality of focus detecting areas; a selection circuit having modes including (i) an optional selection mode for selecting an optional focus detecting area, and (ii) an automatic selection mode for automatically selecting at least one of the plurality of focus detecting areas; a setting circuit for setting, (i) in the optional selection mode, determination criteria to values according to the plurality of focus detecting areas, respectively, and a selected determination criterion to the determination criterion value for the focus detecting area selected by the selection circuit, and (ii) in the automatic selection mode, the selected determination criterion to a lowest of the determination criteria values in the optional selection mode; and a determination circuit for determining whether auxiliary light is to be emitted based on the selected determination criterion.

In yet another aspect, the present invention is directed to a focus detecting device having an auxiliary light mode, in which, when a focus is not appropriately first detected, a focus detecting operation for detecting the focus is executed with auxiliary light being projected. The focus detecting device comprises a plurality of focus detecting areas; detecting means for detecting a focus in each of the plurality of focus detecting areas; and a determination circuit for determining whether the focus detecting operation is to be executed in the auxiliary light mode based on the detected focus and a determination criterion, wherein the determination criterion is set to a predetermined value according to at least one of the plurality of focus detecting areas.

In yet another aspect, the present invention is directed to a camera. The camera comprises a focus detecting device including a plurality of focus detecting areas, the focus detecting device detecting a focus in each of the plurality of focus detecting areas, and having a first selection mode for selecting at least one of the plurality of focus detecting areas by manual selection of an operator and a second selection mode for automatically selecting at least one of the plurality of focus detecting areas; a setting circuit for setting, (i) in the first selection mode, a selected determination criterion to a determination criterion value for a selected focus detecting area, and (ii) in the second selection mode, the selected determination criterion to a fixed criterion; and auxiliary light mode setting means for determining, based on the selected determination criterion, whether to execute a focus detecting operation with auxiliary light being projected, and for executing the focus detecting operation with the auxiliary light being projected.

Further objects, features, and advantages of the present invention will become apparent from the following detailed description of the preferred embodiments with reference to the attached drawings.

DESCRIPTION OF THE PREFERRED EMBODIMENTS

Figure 1:
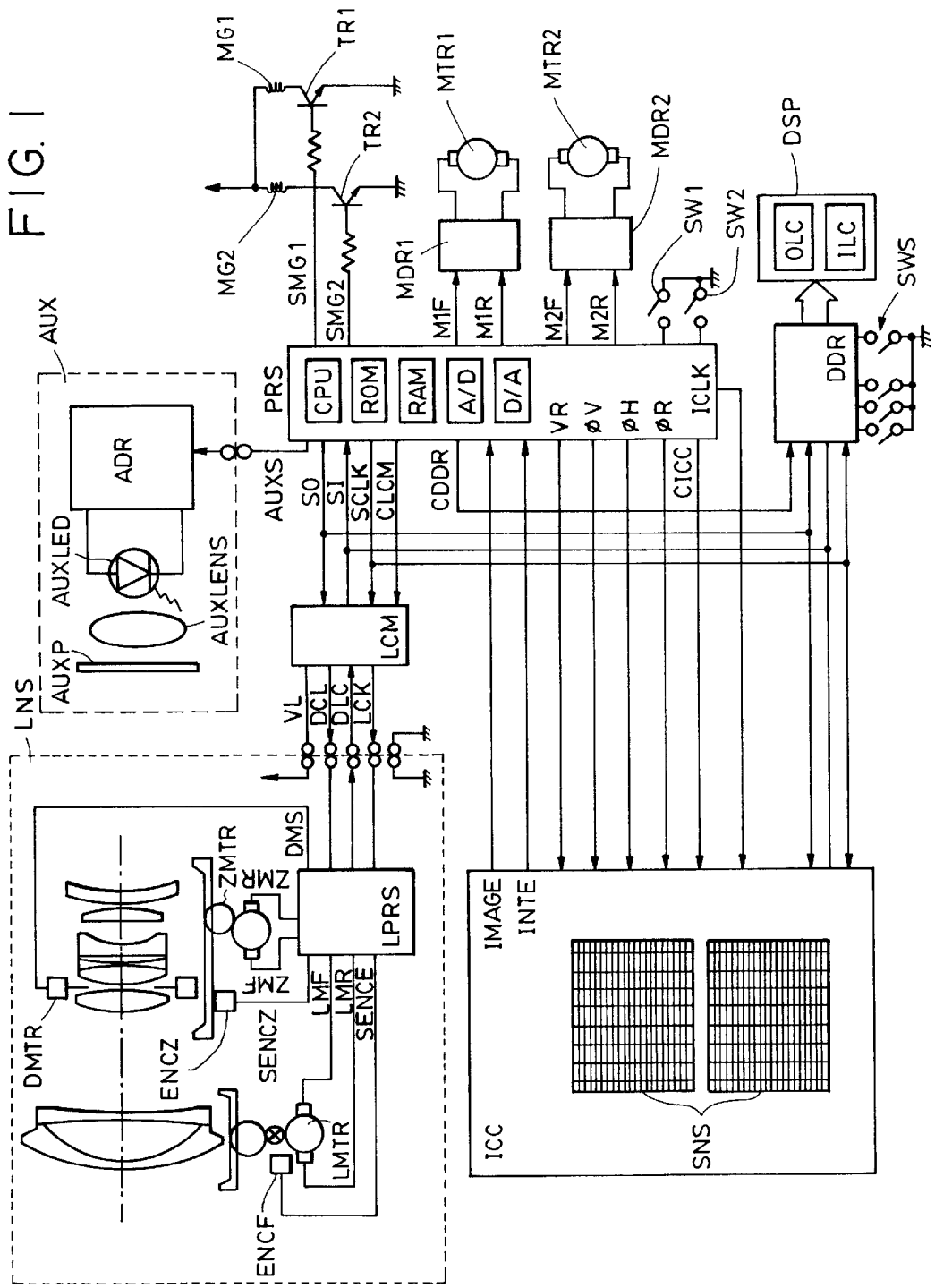
FIG. 1 is a block diagram showing a camera to which a focus detecting device as an embodiment of the present invention is assembled, lenses, and an auxiliary light emitting device.

FIG. 1 is a circuit diagram showing an example of a specific arrangement of a camera to which a focus detecting device acting as an embodiment of the present invention is assembled. First, how respective components are arranged will be described.

In FIG. 1, reference symbol PRS denotes a controller of the camera, which is composed of one chip microcomputer having functions as, for example, a CPU (central processing unit), ROM, RAM, A/D converter, D/A converter, and the like therein. The controller PRS executes a series of operations of the camera such as an automatic exposure control function, an automatic focus adjustment function, a film winding and rewinding function, and the like in accordance with a sequence program of the camera stored in the ROM. For these operations, the controller PRS controls the operation of respective circuits and a lens by communicating with a peripheral circuit and an in-lens control circuit in the main body of the camera using communication signals SO, SI, and SCLK, and communication selection signals CLCM, CDDR, and CICC.

The communication signal SO is a data signal supplied from the controller PRS, the communication signal SI is a data signal supplied to the controller PRS, the communication signal SCLK is a synchronous clock of the data signals SO and SI.

Reference symbol LCM denotes a lens communication buffer circuit which supplies electric power to a lens power supply terminal VL when the camera is active, and acts as a communication buffer between the camera and the lens when the communication selection signal CLCM from the controller PRS is at a high potential level (to be abbreviated as "H" hereinafter, a low potential level will be abbreviated as "L" hereinafter).

When the controller PRS sets the communication selection signal CLCM to "H" and sends a predetermined data signal SO in synchronism with the synchronous clock SCLK, the lens communication buffer circuit LCM supplies the synchronous clock SCLK and the respective buffer signals LCK and DCL of the data signal SO to the lens LNS through communication contacts between the camera and the lens. At the same time, the lens communication buffer circuit LCM supplies the data signal SI as the buffer signal of a signal DLC from the lens LNS, and the controller PRS receives the data signal SI in synchronism with the synchronous clock SCLK.

Reference symbol DDR denotes a detection and display circuit for detecting and displaying various switches SWS. The detection and display circuit is selected when the communication selection signal CDDR is set to "H" and controlled by the controller PRS using the data signals SO and SI and the synchronous clock SCLK. That is, the detection and display circuit DDR switches a display of a display member DSP of the camera based on data sent from the controller PRS and notifies ON/OFF states of various operation members of the camera to the controller PRS through communication. Reference numeral OLC denotes an outside liquid crystal display unit located on an upper portion of the camera, and reference symbol ILC denotes an in-finder liquid crystal display unit. In this embodiment, a focus detecting operation region (selection of focus detecting points) and the like are set by these switches SWS.

Reference symbols SW1 and SW2 denote switches associated with a release button (not shown). The switch SW1 is turned on in response to depression of the release button in a first stage, and, subsequently, the switch SW2 is turned on in response to depression thereof in a second stage. When the switch SW1 is turned on, the controller PRS measures light and automatically adjusts a focus and controls exposure and thereafter winds up a film thereafter using a turned-on state of the switch SW2 as a trigger.

Note that the switch SW2 is connected to an "interrupt input terminal" of the controller PRS composed of the microcomputer. Thus, when the switch SW2 is turned on, the controller PRS enables interruption and shifts its control to a predetermined interrupted program at once even if the switch SW is turned on and another program is being executed. Reference symbol MTR1 denotes a film feed motor, and reference symbol MTR2 denotes a motor for moving a mirror upward and downward and charging a shutter spring. These motors are driven forward and rearward by respective drive circuits MDR1 and MDR2. Signals M1F, M1R, M2F, and M2R supplied from the controller PRS to the drive circuits MDR1 and MDR2 are motor control signals.

Reference symbols MG1 and MG2 denote magnets for starting travel of front and rear curtains of a shutter, respectively. These magnets are energized by amplifying transistors TR1 and TR2 in response to signals SMG1 and SMG2, and the shutter is controlled by the controller PRS.

Note that since drive of these motors and control of the shutter are not directly related to the present invention, detailed description thereof is omitted. The signal DCL, which is supplied to the in-lens control circuit LPRS in synchronism with the synchronous clock SCLK, is a data signal of a command from the camera to the lens LNS, and an operation of the lens LNS to the command is previously determined. The in-lens control circuit LPRS analyzes the command according to a predetermined procedure and outputs a focus adjustment operation and a diaphragm control operation, the operating state of the respective components of the lens LNS in response to the data signal DLC (how a focus adjustment optical system and the diaphragm are driven), and various parameters (the F-number of an open diaphragm, focal length, coefficient of an amount of movement of the focus adjustment optical system to an amount of defocus, various amounts of focus correction, and the like). Since a zoom lens is exemplified in this embodiment, when a focus adjustment command is sent from the camera, a focus adjustment motor LMTR is driven according to an amount of drive and a direction thereof, which are sent simultaneously with the command, in response to signals LMF and LMR so that a focus is adjusted by moving the focus adjustment optical system in an optical axis direction. An amount of movement of the optical system is counted by detecting the patterns of a pulse plate, which is rotated in association with the movement of the optical system, by a photocoupler, monitored through a pulse signal SENCE of an encoder circuit ENCF which outputs the number of pulses according to the amount of movement, and counted by a counter in the in-lens control circuit LPRS. On completion of the predetermined movement of the optical system, the in-lens control circuit LPRS sets the signals LMF and LMR to "L" by itself and stops the focus adjustment motor LMTR by applying a brake thereto.

As a result, after the focus adjustment command is sent once from the camera, the controller PRS of the camera need not be concerned with the drive of the lens. Further, it is also possible to send the contents of the counter to the camera when requested therefrom.

When a diaphragm control signal is sent from the camera, the controller LPRS drives a stepping motor DMTR, which is well known as a diaphragm drive motor, in accordance with a step number of the diaphragm sent at the same time and using a diaphragm signal DMS. Note that since the stepping motor DMTR can be subjected to open control, it does not need an encoder for monitoring its operation.

A zoom motor ZMTR is driven in response to signals ZMR and ZMF and moves a zoom position of a zoom optical system. Reference symbol ENCZ denotes an encoder circuit accompanying the zoom optical system, and the in-lens control circuit LPRS is supplied with a signal SENCZ from the encoder circuit ENCZ and detects the zoom position. The in-lens control circuit LPRS stores lens parameters at respective zoom positions and sends a parameter corresponding to a present zoom position to the camera when requested from the controller PRS of the camera.

Reference symbol ICC denotes an integrated circuit including focus detecting area sensors SNS composed of CCDs and the like and a drive control circuit of the area sensors SNS. The integrated circuit ICC is selected when the communication selection signal CICC is set to "H" and controlled by the controller PRS using the data signals SO and SI and the synchronous clock SCLK. Reference symbols φV, φH, and φR are signals for reading and resetting an output from the area sensors SNS, and a sensor control signal is created by the drive control circuit in the integrated circuit ICC based on these signals φV, φH, and φR from the controller PRS. The sensor output from a sensor unit is amplified after it is read therefrom and supplied to an analog input terminal of the controller PRS as an output signal IMAGE together with an accumulation time and an amplifying gain when the output is read out. The controller PRS subjects the output signal IMAGE to A/D conversion and then sequentially stores the digital values of the signal in a predetermined address of the RAM and further detects a focus using the signal having been converted into the digital values.

Reference symbol VR denotes an accumulation completion determination level, which is common to respective differential amplifiers of the sensor unit, reference symbol INTE denotes an accumulation completion output signal (which is outputted when it is determined that an integrated value of the output from the sensor unit is set to an appropriate level in comparison to the accumulation completion determination level), and reference symbol ICLK denotes a reference clock circuit of the drive control circuit in the integrated circuit ICC. Further, when it is determined that a focus detecting accuracy can be increased by projecting auxiliary light by an accumulation time signal (a signal showing a time until accumulation is completed), which is read together with a sensor output signal when that signal is read out, the controller PRS instructs to emit auxiliary light.

Reference symbol AUXS denotes an auxiliary light emission command supplied to an auxiliary light unit AUX, reference symbol AUXLED denotes a light emitting diode for emitting auxiliary light, the light emitting diode being controlled by a drive circuit ADR, reference symbol AUXLENS denotes a projection lens for projecting an auxiliary light pattern, and reference symbol AUXP denotes a prism for dividing the auxiliary light pattern.

Figure 2:
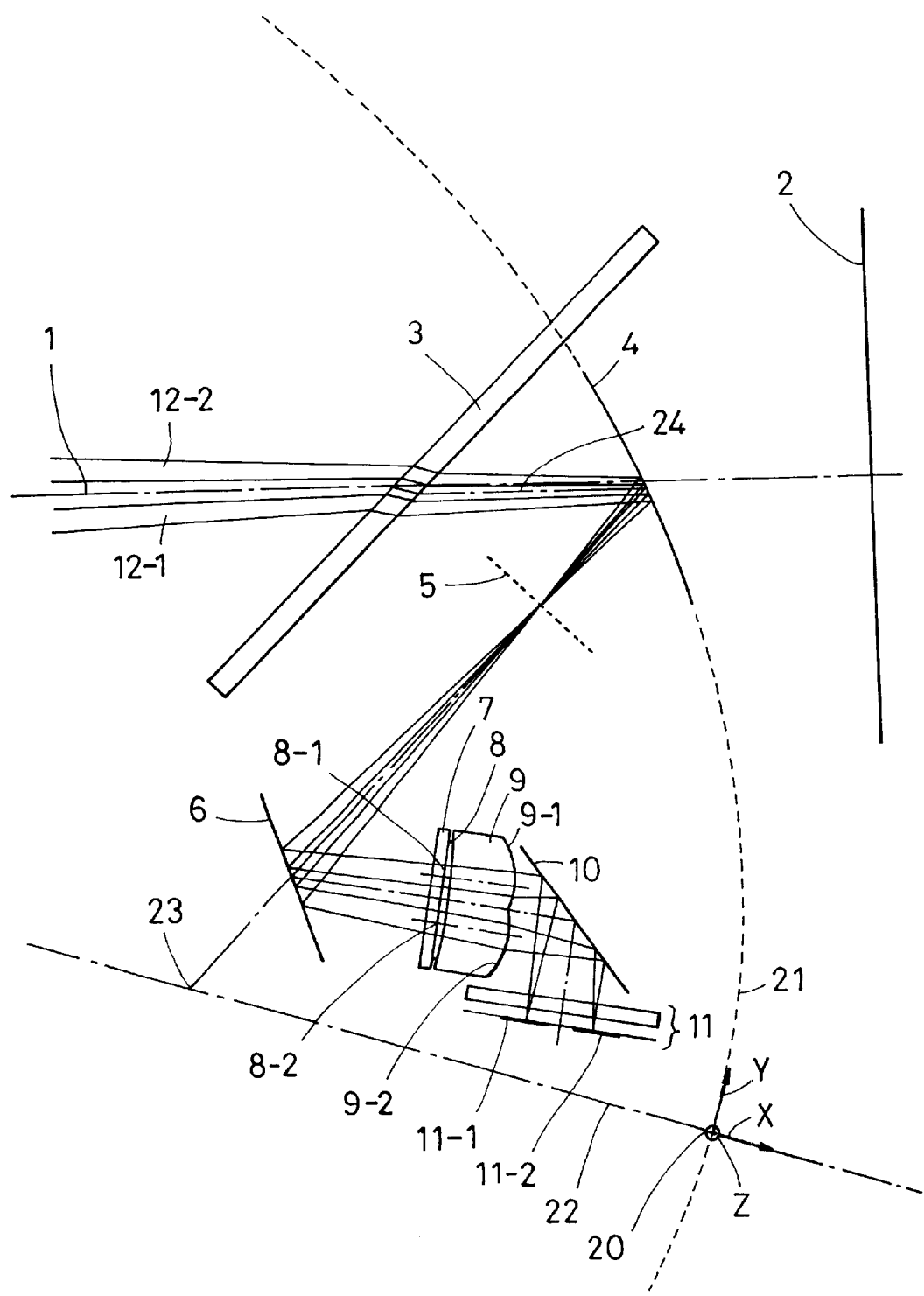
FIG. 2 is a view showing a schematic arrangement of the focus detecting device as the embodiment of the present invention.

FIG. 2 is a view showing how respective components are optically disposed to detect a focus at a plurality of focus detecting points in a photographing screen in the camera shown in FIG. 1. In FIG. 2, reference numeral 1 denotes an optical axis of an objective lens (not shown), reference numeral 2 denotes a film, reference numeral 3 denotes a semi-transparent main reflector disposed on the optical axis 1 of the objective lens, reference numeral 4 denotes a first reflector obliquely disposed on the optical axis 1 of the objective lens similarly, reference numeral 5 denotes a near-axis imaging surface that is formed by the first reflector 4 and conjugate with the film 2, reference numeral 6 denotes a second reflector, reference numeral 7 denotes an infrared cut filter, reference numeral 8 denotes a diaphragm having two openings 8-1 and 8-2, reference numeral 9 denotes a secondary imaging system having two lenses 9-1 and 9-2 disposed in correspondence to the openings 8-1 and 8-2 of the diaphragm 8, reference numeral 10 denotes a third reflector, reference numeral 11 denotes a photoelectric conversion element having two area sensors 11-1 and 11-2. The first reflector 4 has a radius of curvature and converging power for projecting the two openings 8-1 and 8-2 of the diaphragm 8 in the vicinity of the projection pupil of the objective lens (not shown). Further, the first reflector 4 has a metal film comprised of aluminum, silver or the like deposited thereon by vapor deposition so that only a necessary region of the reflector reflects light. The first reflector 4 also acts as a field of view mask for restricting a range in which a focus is detected.

Metal films are also deposited on only the necessary minimum regions of the other reflectors 6 and 10 to reduce stray light incident on the photoelectric conversion element 11. It is effective to coat light absorbing paint or the like on the regions of the respective reflectors which do not act as reflecting surfaces or to dispose shield members in the vicinity of them.

In the above arrangement, light beams 12-1 and 12-2 from the objective lens (not shown) of FIG. 2 are reflected by the first reflector 4 in a direction approximately along an inclination of the main mirror 3 after it has passed through the main mirror 3. Then, the light beams 12-1 and 12-2 are converged by the respective lenses 9-1 and 9-2 of the secondary imaging system 9 having passed through the infrared cut filter 7 and the two openings 8-1 and 8-2 of the diaphragm 8 after the direction thereof has been changed again by the second reflector 6, and arrive on the area sensors 11-1 and 11-2 of the photoelectric conversion element 11 through the third reflector 10. While the light beams 12-1 and 12-2 in FIG. 2 show light beams which form an image at a center of the film 2, light beams which form an image at other positions of the film 2 also reach the photoelectric conversion element 11 through similar paths. Accordingly, two distributed quantities of light which correspond to a predetermined two-dimensional region on the film 2 are formed on the respective area sensors 11-1 and 11-2 of the photoelectric conversion element 11 as a whole.

In this embodiment, the first reflector 4 is formed by a part of a curved surface which is made by turning a quadratic curve about an axis, and, in particular, an ellipsoid of revolution is preferably used. In FIG. 2, (i) a surface of the first reflector 4 is composed of a part of an ellipsoid of revolution, which is made by rotating an ellipse 21 having an apex at a point 20 about an axis 22, and (ii) foci of the first reflector 4 are set in the vicinity of an image position 23 at a center of the diaphragm 8 made by the second reflector 6, and in the vicinity of a point (not shown) which is located on a line extending from an optical axis 24 after it has passed through the main mirror 3. If the point located on the line extending from the optical axis 24 is located in the vicinity of a position of the projection pupil of the objective lens (when various objective lens are used as interchangeable lenses, an average position of the projection pupils thereof), an incident position of the secondary imaging system 9 is approximately imaged at the position of the projection pupil of the objective lens. As a result, the first reflector 4 acts as an ideal field lens. As apparent from FIG. 2, a portion which is optically used as the first reflector 4 is a region which does not include the axis of rotation and the apex of the elliptic surface of revolution.

Further, in this embodiment, a first surface of the secondary imaging system 9 is formed in a concave shape so that light incident on the secondary imaging system 9 is not unnaturally refracted, whereby an excellent and uniform imaging performance can be secured over a wide range of the two-dimensional region of the photoelectric conversion element 11.

Figure 15:
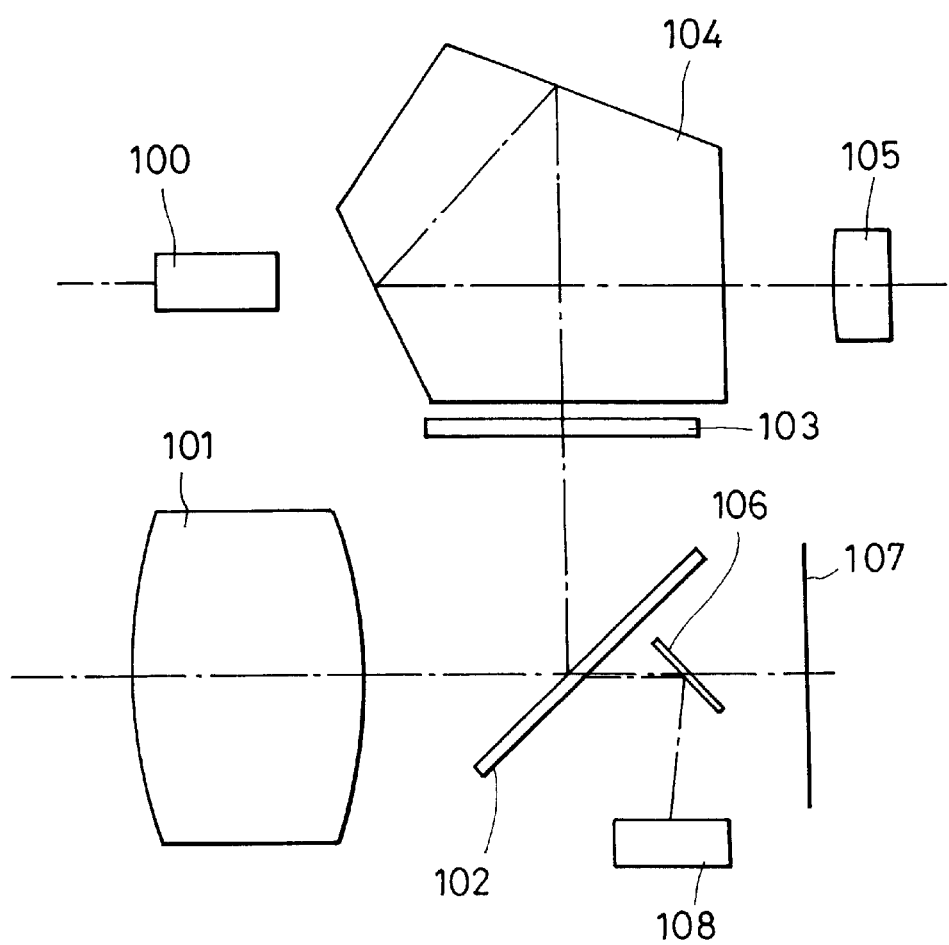
FIG. 15 is a view showing an example of a disposition of a conventional focus detecting device and a conventional auxiliary light emitting device in a camera.
Figure 16:
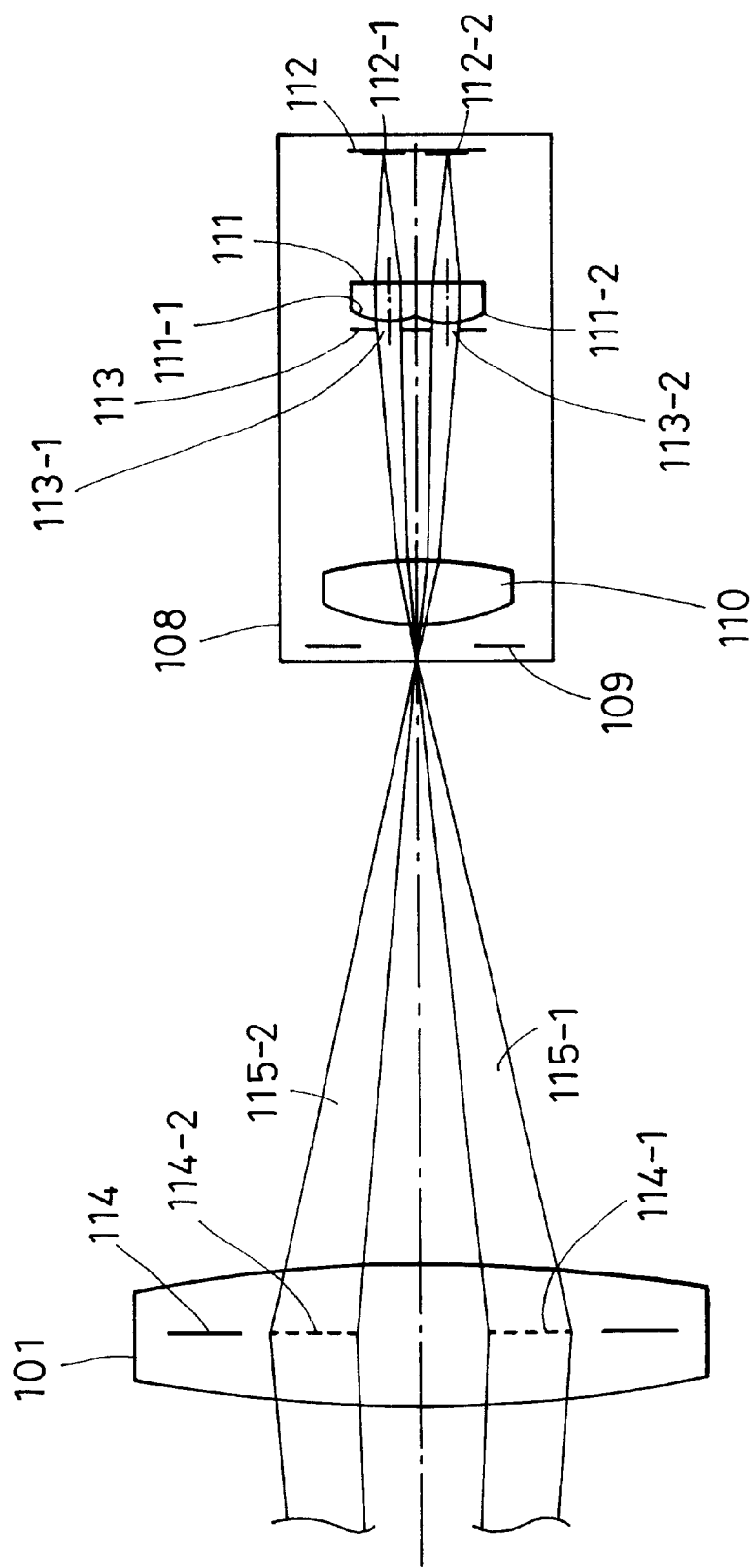
FIG. 16 is a view showing an example of an arrangement of the conventional focus detecting device.
Figure 17:
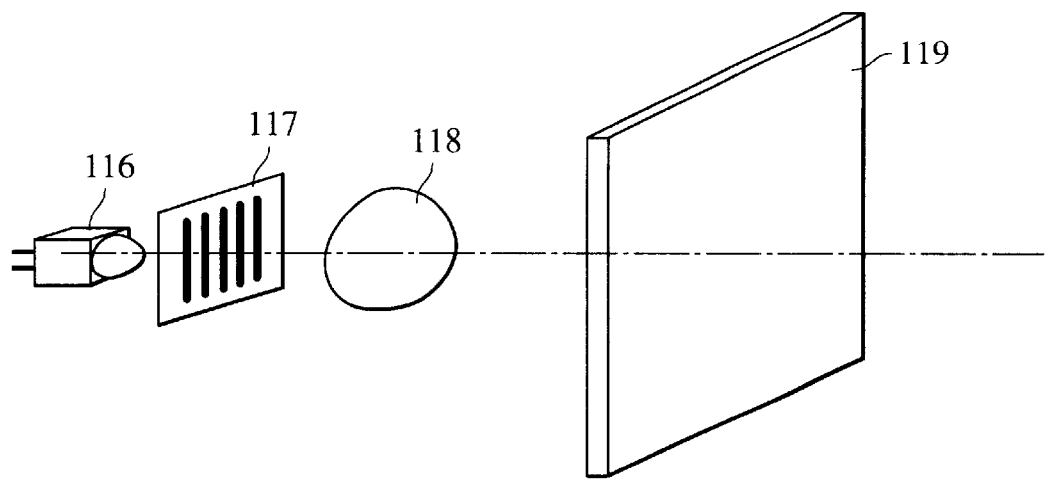
FIG. 17 is a view showing a schematic arrangement of the conventional auxiliary light emitting device.
Figure 18:
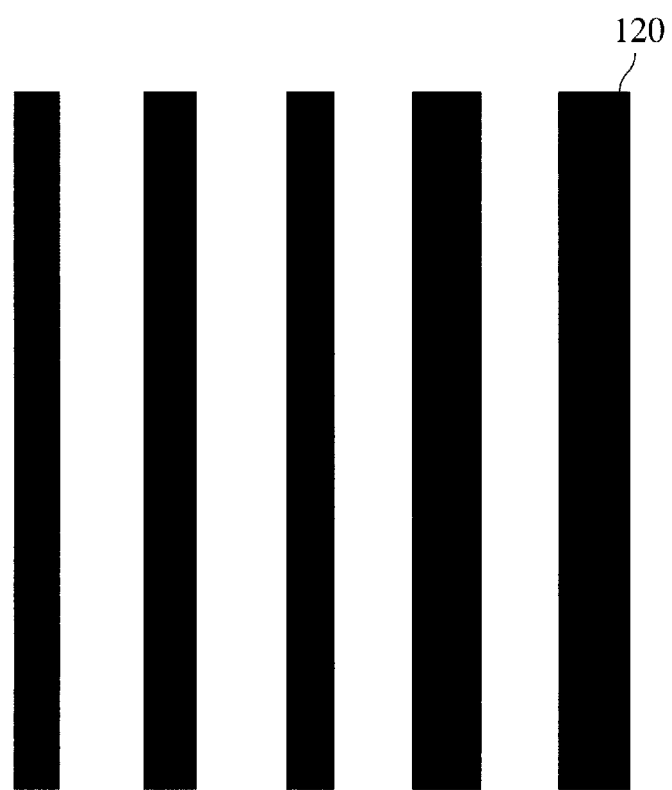
FIG. 18 is a view showing a pattern of conventional auxiliary light projected onto a subject.

A focusing state of the objective lens can be two-dimensionally detected by calculating a relative positional relationship of the two area sensors 11-1 and 11-2 shown in FIG. 2 in a separating direction at the respective positions of the area sensors 11-1 and 11-2 with respect to the thus obtained two distributed quantities of light based on a principle similar to that described in FIG. 15.

Note that when a picture is taken, the first reflector 4 is retreated to the outside of a photographing light path as is the main mirror 3.

Next, the photoelectric conversion element 11 will be described in detail.

Figure 3:
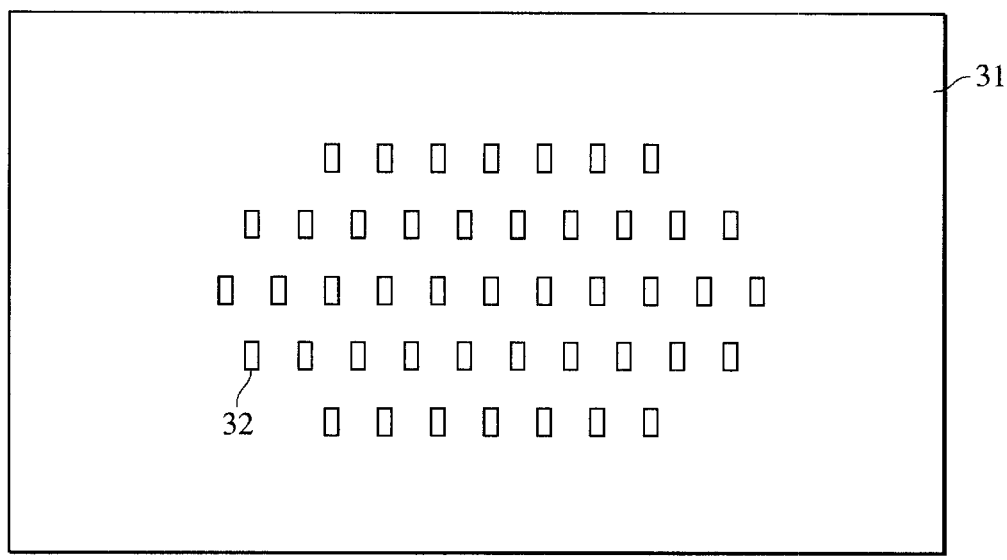
FIG. 3 is a view showing how a plurality of focus detecting points are disposed in a photographing screen in an embodiment of the present invention.

FIG. 3 shows a distributed set of focus detecting points in this embodiment when they are observed through a finder of the camera. As shown in FIG. 3, a focus can be detected at a total of 45 focus detecting points 32 composed of 7 divided points, 10 divided points, 11 divided points, 10 divided points, and 7 divided points from an upper portion of a photographing screen 31. The photoelectric conversion element 11 of FIG. 2 is used with each of the two area sensors 11-1 and 11-2 divided into 45 portions so that they correspond to the 45 focus detecting points 32.

Each of the respective regions, which are divided into the 45 portions, of each of the area sensors 11-1 and 11-2 has a circuit arrangement capable of obtaining an optimum signal output in accordance with luminance of a subject with its accumulation controlled independently.

Further, when signals outputted from the respective regions of each of the area sensors 11-1 and 11-2 divided into the 45 portions are read, accumulation time information and the amplifier gain information of sensor outputs also can be obtained together with the signals.

When it is determined that an optimum signal output cannot be obtained from the accumulation time information and the like and when a result of calculation executed by a focus detecting unit is not good, an auxiliary light emitting device mounted on the outside of the camera or built therein is emitted so as to illuminate a subject or to project a pattern to the subject so that an optimum signal output can be obtained.

Figure 4:
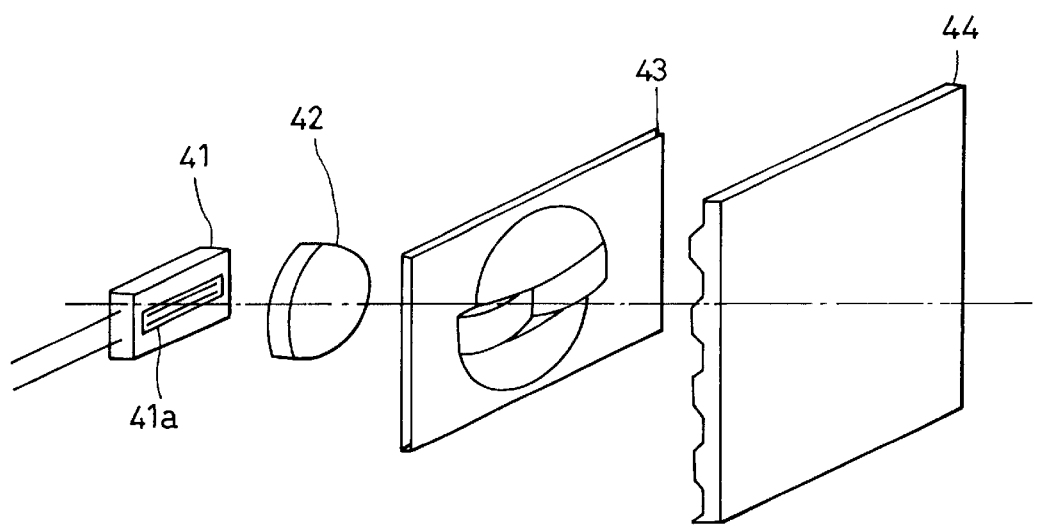
FIG. 4 is a view showing a schematic arrangement of an example of an auxiliary light emitting device used in the present invention.

FIG. 4 is a view showing an example of the auxiliary light emitting device for projecting a pattern to the plurality of focus detecting points, wherein reference numeral 41 denotes a light emitting diode having a pattern 41a on a light emitting portion, reference numeral 42 denotes a condenser for condensing light from the light emitting diode, reference numeral 43 denotes a light projection lens for projecting the pattern 41a of the light emitting diode 41 onto the subject, and reference numeral 44 denotes a division prism for dividing the projected light pattern into upper and lower portions.

Figure 5:
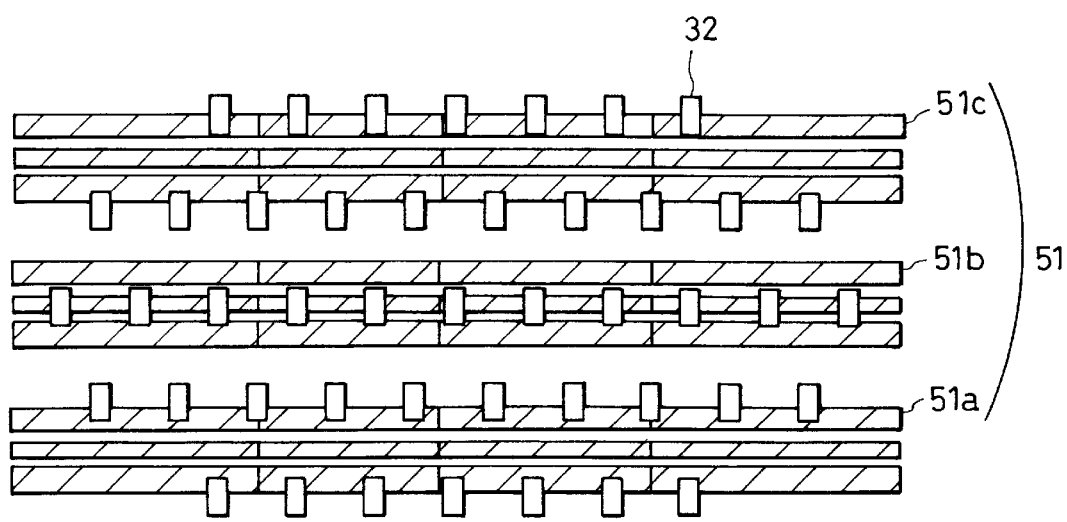
FIG. 5 is a view showing an example of a pattern of auxiliary light projected onto a subject from the auxiliary light emitting device of FIG. 4.

FIG. 5 is a view showing an example of the pattern projected by the auxiliary light emitting device of FIG. 4. Reference numeral 51 shows a shape of an pattern image formed on a subject by the pattern 41a of the light emitting diode projected thereonto. Reference numerals 51a, 51b, and 51c show divided pattern images divided into three portions vertically, respectively. Reference numeral 32 denotes the 45 focus detecting points on the subject when a lens having a focal length of 28 mm is mounted.

Figure 6:
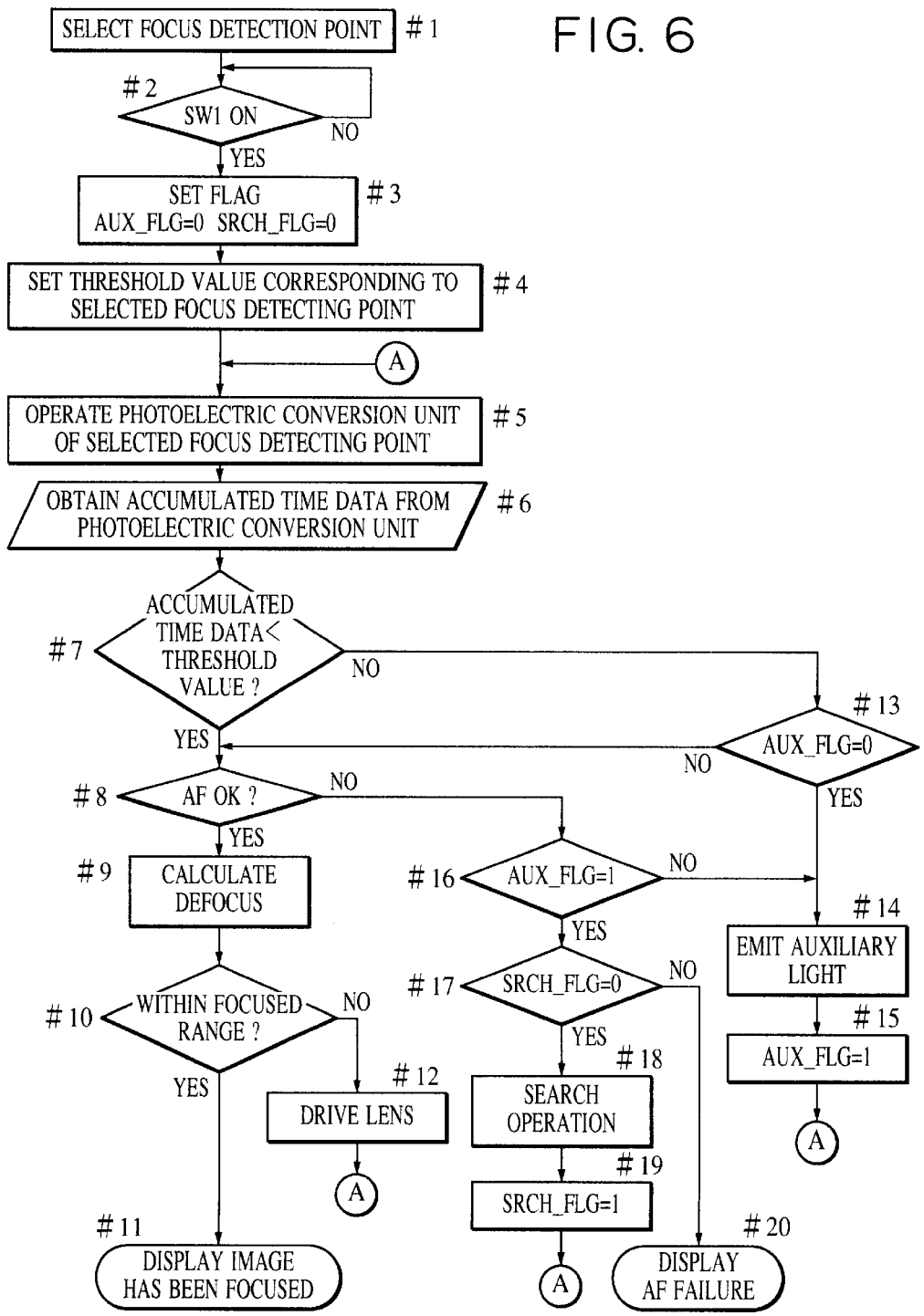
FIG. 6 is a flowchart showing an example of operation of a controller of FIG. 1.

FIG. 6 is a flowchart showing a process from a time the switch SW1 is turned on to a time focus detection is finished or a process until the controller PRS determines that focus detection has failed. At step 1, a focus detecting point is selected from a plurality of focus detecting points, and, at step 2, it is determined whether or not the switch SW1 is turned on by depressing the release button in a first stage. When it is determined that the switch SW1 is turned on, the process goes to step S3 at which an auxiliary light emission flag AUX_FLG and a search operation flag SRCH_FLG are set 0. Next, at step 4, an auxiliary light emission threshold value corresponding to the selected focus detecting point (a threshold value of accumulation time data) is set, and at step 5 a photoelectric conversion unit corresponding to the selected focus detecting point is operated. At step 6, information such as a signal output, accumulation time and the like is obtained from the photoelectric conversion unit, and at step 7 the auxiliary light emission threshold value set at step 4 is compared with the information obtained at step 6. When it is determined that an optimum signal output can be obtained, the process goes to step 8 and it is determined whether a focus can be detected or not. When it is determined that the focus can be detected, the process goes to step 9 at which defocus is calculated. Next, at step 10, it is determined whether or not a quantity of defocus calculated is within a focusing range, and when it is within the focusing range, it is displayed at step 11 that an image has been focused, and the focus detecting operation is finished.

Further, when it is determined at step 10 that the amount of defocus is out of the focusing range, the lens is driven based on the quantity of defocus, and the process returns to step 5 where a series of operations is resumed.

Further, when it is determined at step 7 that the optimum signal output cannot be obtained, the process goes to step 13 at which whether or not auxiliary light was emitted last time was determined based on the auxiliary light emission flag AUX_FLG. When the auxiliary light was not emitted last time, the process goes to step 14 at which auxiliary light is emitted. At step 15, the auxiliary light emission flag AUX_FLG is set to 1, and the process returns to step 5 at which the series of operations is resumed. Further, when it is determined at step 13 that the auxiliary light was emitted last time, the process goes to step 8 at which whether or not the focus can be detected is determined.

When it is determined that the focus cannot be detected at step 8, the process goes to step 16 at which it is determined whether or not the auxiliary light was emitted last time. When the auxiliary light was not emitted last time, the process goes to step 14 and executes the above-mentioned operations. When it is determined at step 16 that the auxiliary light was emitted last time, the process goes to step 17 at which whether or not a search operation was executed last time is determined. When the search operation was not executed, the process goes to step 18 and executes the search operation. The search operation is such that when the focus cannot be detected, the lens is driven tentatively, and a focus detecting operation is executed while the lens is being driven or after it has been driven a predetermined amount so as to search a position of the focus. Then, the search operation flag SRCH_FLG is set to 1, an auxiliary light emission flag AUX_FLG is set to 1, and the process returns to step 5 at which the series of operations is resumed. When the search operation was executed last time at step 17, the process goes to step 20 at which focus detection failure is displayed.

Figure 7A:
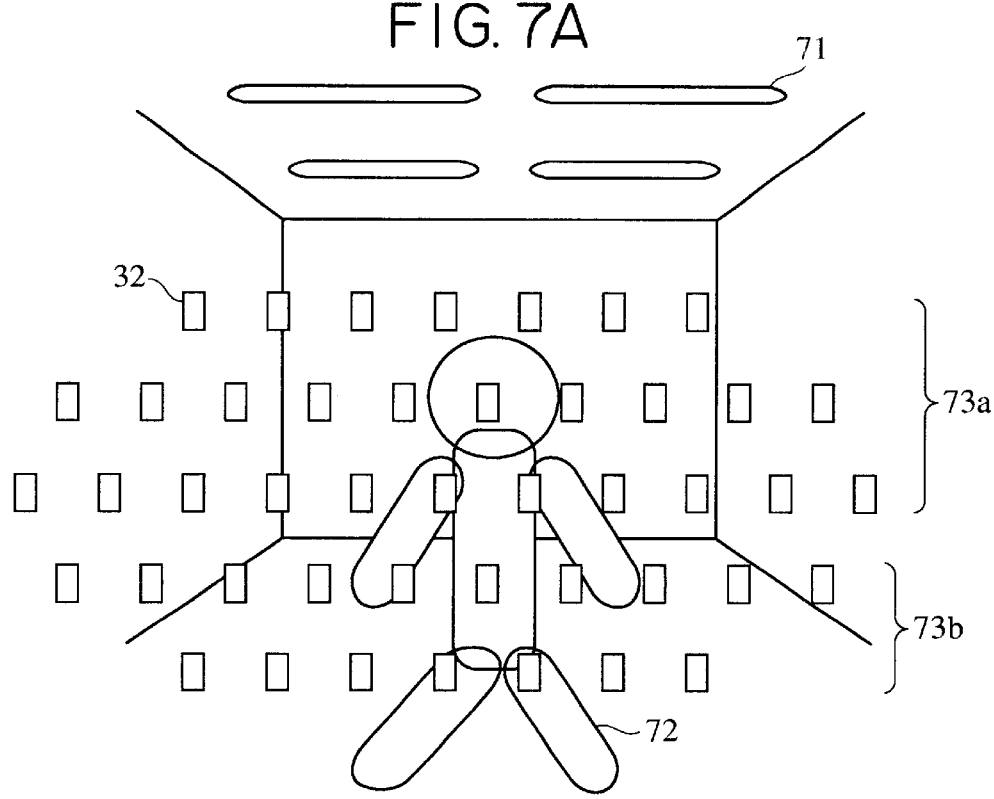
FIGS. 7A and 7B are views each showing a relationship between focus detecting points of FIG. 3 and a subject in a photographing screen.
Figure 7B:
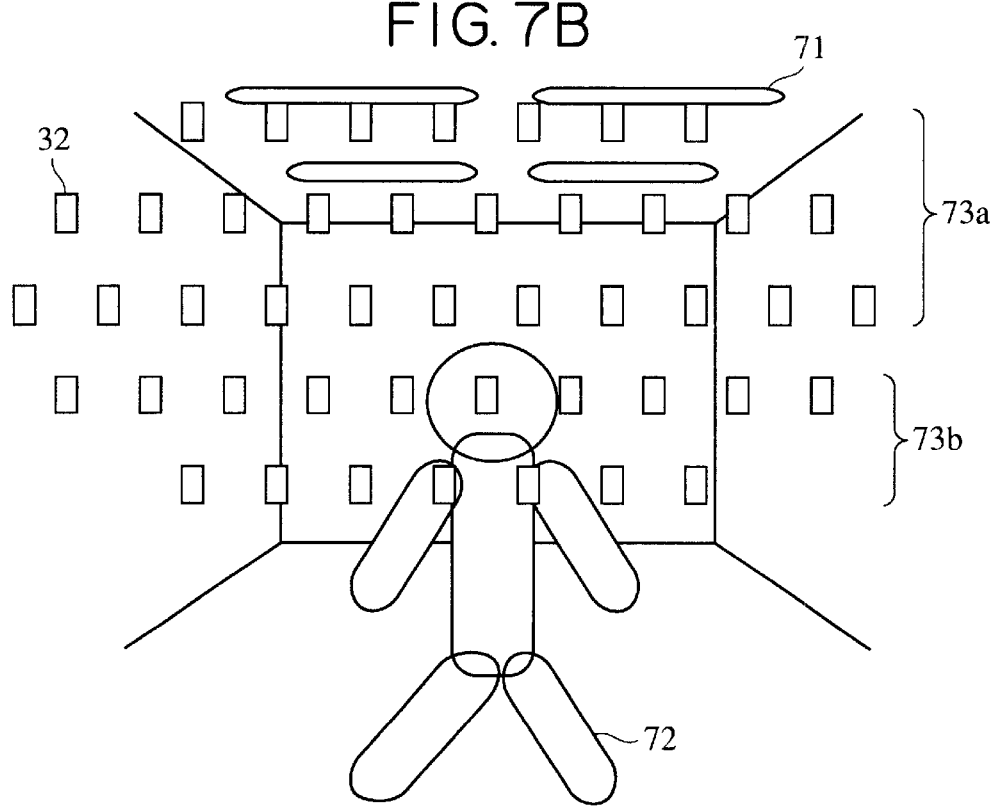

FIGS. 7A and 7B are views showing that a focus detecting capability is different depending upon upper and lower positions of the focus detecting points 32 in the photographing screen when a picture is taken in a room. FIG. 7A is a view showing a case in which a focus is detected on an upper focus detecting point in the photographing screen, and FIG. 7B is a view showing a case in which the focus is detected on a lower focus detecting point in the photographing screen.

In FIGS. 7A and 7B, reference numeral 71 denote illuminations, reference numeral 72 denotes a subject, reference numeral 32 denotes the 45 focus detecting points, reference numeral 73a denotes a group of focus detecting points disposed on an upper side of the photographing screen, and reference numeral 73b denotes a group of focus detecting points disposed on a lower side of the photographing screen.

In FIG. 7A, when the focus is detected in the region of the group of focus detecting points 73a on the upper side of the photographing screen, light having a relatively high degree of luminance is liable to be incident thereon from the illuminations 71 on a ceiling, and the like. As a result, a ghost is liable to be caused by internal reflection and the like in a focus detecting optical system, by which a focus detecting accuracy is liable to be deteriorated due to a reduced degree of luminance of the subject 72.

In contrast, in FIG. 7B, when the focus is detected by the group of focus detecting points 73b on the lower side of the photographing screen, light having a relatively high degree of luminance is less likely to be incident thereon from the illuminations 71 on a ceiling, and the like. As a result, no ghost is caused by internal reflection and the like in the focus detecting optical system, by which an excellent focus detecting accuracy can be obtained because a good signal can be acquired.

As described above, even if the focus is detected as to the subject 72 having the same degree of luminance, a different focus detecting accuracy is obtained between the upper focus detecting points and the lower focus detecting points on the photographing screen.

Figure 8A:
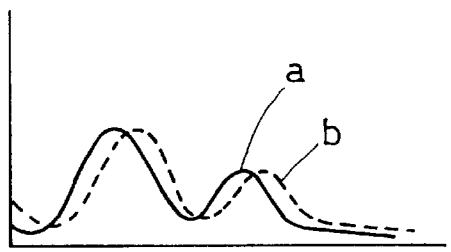
FIGS. 8A, 8B and 8C are graphs showing quantities of light distributed by photoelectric conversion element rows in states shown in FIGS. 7A and 7B.
Figure 8B:
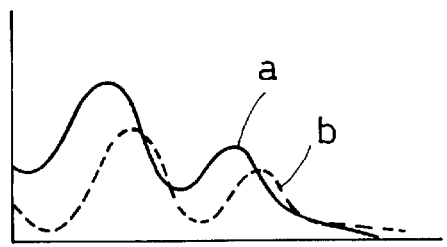
Figure 8C:
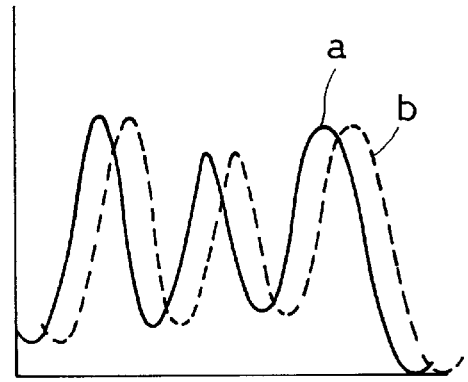

FIGS. 8A and 8B are graphs showing examples of sensor outputs in the states shown in FIGS. 7A and 7B, and FIG. 8C is a graph showing a sensor output when auxiliary light is projected in the state of FIG. 7B.

In the respective figures, reference symbols a and b denote two sensor outputs having a different phase. It can be found in FIG. 8A that the focus can be normally detected because the sensor outputs a and b have no difference of level and a phase difference is not erroneously detected. Whereas, in FIG. 8B, the focus cannot be properly detected because a difference of level is caused in the sensor outputs a and b due to a ghost and a phase difference is erroneously detected. In FIG. 8C, contrast and luminance of the subject 72 are increased by projecting a pattern of auxiliary light, which permits a high signal output to be outputted so that the focus can be properly detected because no difference of level is obtained in the sensor outputs a and b.

Figure 9A:
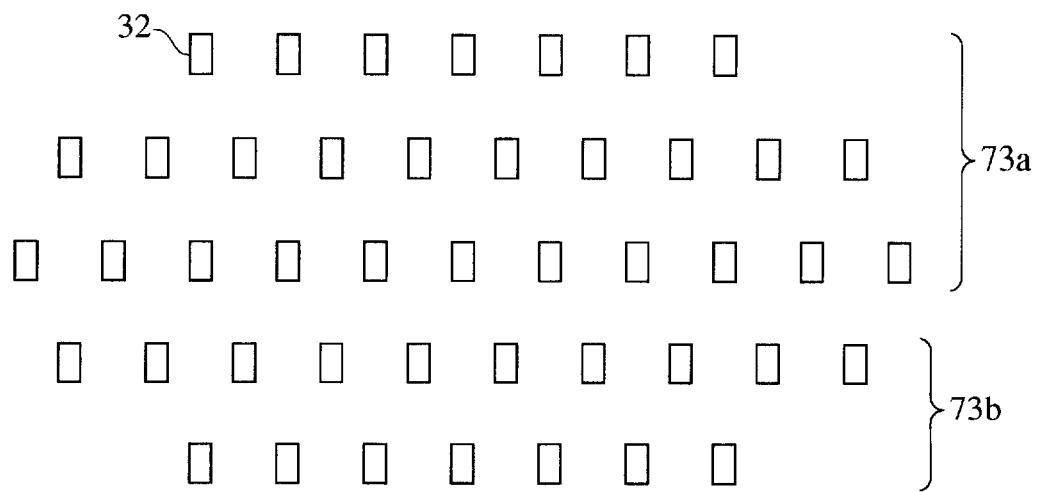
FIGS. 9A and 9B are views showing examples of grouping of the focus detecting points shown in FIG. 3.
Figure 9B:
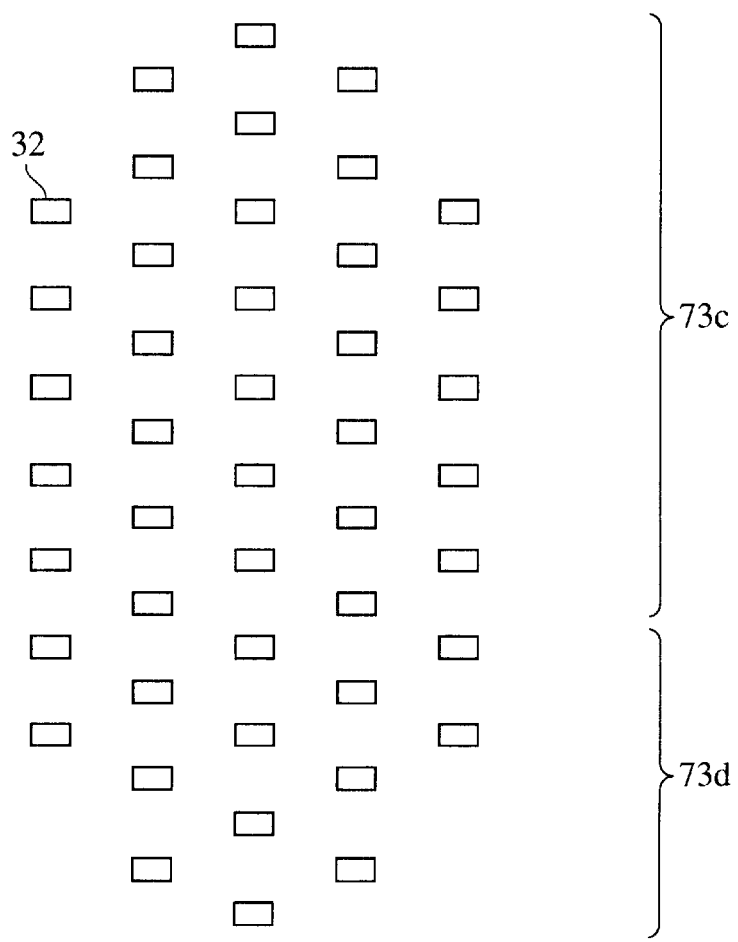

FIG. 9A is a view showing that the focus detecting points in the photographing screen are divided by upper and lower regions to set the auxiliary light emission threshold value, wherein a group of focus detecting points on an upper side of the photographing screen is denoted by 73a and a group of focus detecting points on a lower side thereof is denoted by 73b. Further, FIG. 9B is a view when the camera is positioned longitudinally, wherein reference numeral 73c denotes a group of upper focus detecting points and reference numeral 73d denotes lower focus detecting points.

Whether auxiliary light is to be emitted or not will be described below specifically.

In a first example, the focus detecting points located on the upper side of the photographing screen are grouped into a group A, the focus detecting points located on the lower side of the photographing screen are grouped into a group B, sensors corresponding to the respective groups are denoted by SNSA and SNSB, accumulation times of the sensors are denoted by IntTime_A and IntTime_B, respectively, and an auxiliary light emission threshold value to the accumulation times of the sensors for determining whether auxiliary light is to be emitted or not is denoted by Tref. When a sensor accumulation time exceeds Tref, it is determined that auxiliary light is to be emitted.

Conventionally, the auxiliary light emission threshold value is set uniformly with conditions set to IntTime_A>Tref and IntTime_B>Tref. Thus, when it is intended to cause the auxiliary light emission threshold value to conform to the focus detecting points of the group A, auxiliary light cannot be effectively emitted in the focus detecting points in the region of the group B because auxiliary light emitting conditions are not satisfied until a focus detecting accuracy is deteriorated.

To improve the above problem, whether or not auxiliary light is to be emitted is determined in the respective groups based on IntTime_A>Tref_A, IntTime_B>Tref_B, and Tref_A>Tref_B, so that it is easy to project auxiliary light when the focus is detected in the group B. As a result, projection of auxiliary light can be properly permitted at a timing at which an increase of a focus detecting accuracy can be expected by the projection of the auxiliary light. Note that Tref_A denotes an auxiliary light emission threshold value to the focus detecting points of the group A, and Tref_B is an auxiliary light emission threshold value to the focus detecting points of the group B. These auxiliary light emission threshold values Tref_A and Tref_B are previously determined by a designer based on an experiment and the like. For example, a difference between the auxiliary light emission threshold values Tref_A and Tref_B is approximately set to an integral multiple (for example, about twice).

Figure 10:
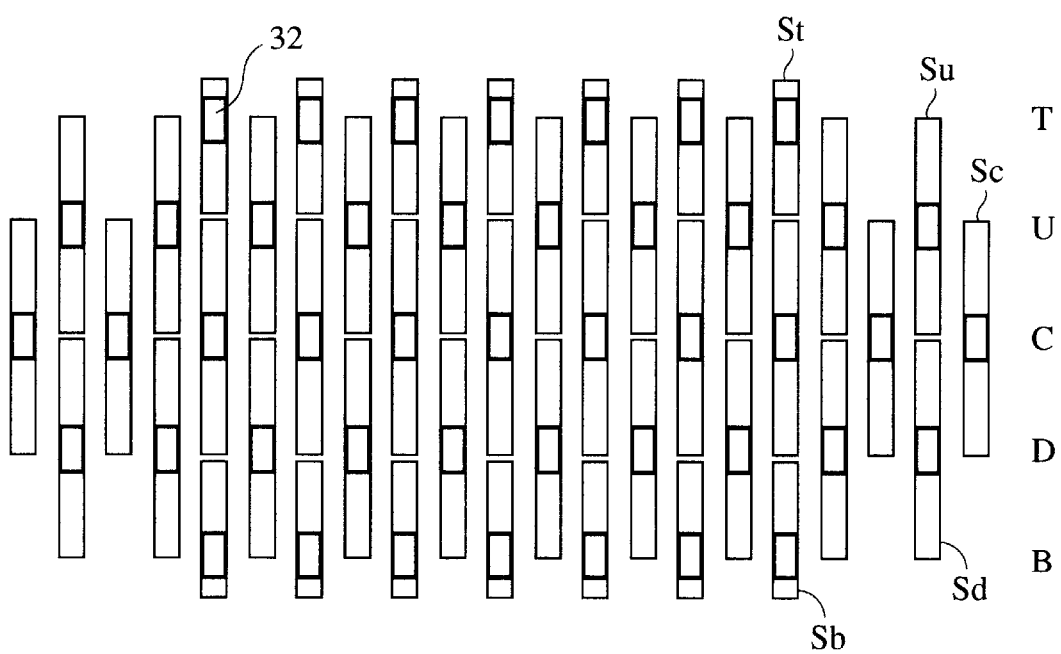
FIG. 10 is a view showing another example of grouping of the focus detecting points shown in FIG. 3.

FIG. 10 shows a second example of the method of grouping the auxiliary light emission threshold values of a plurality of focus detecting points in the photographing screen.

Reference symbols T, U, C, D, and B denote regions of a photographing screen divided into five portions in an up and down direction, respectively, and reference symbols St, Su, Sc, Sd, and Sb denote fields of view of sensors of respective focus detecting points 32. The fields of view of the sensors are defined as fields of view on a region where photoelectric conversion can be executed or on a film surface, and a center of each field of view acts as a focus detecting point. In the focus detecting points of the regions T and B in the periphery of the photographing screen in the up and down direction, the fields of views of the sensors on the outside are shortened by being restricted by an optical system in which a relationship of St=Sb<Su=Sc=Sd is established. When the fields of views of the sensors are short, a defocus detecting capability is lowered because a large phase difference cannot be detected. Further, an image is moved in a large amount due to a change of image magnification on a sensor resulting from a defocused photographing lens in the fields of views of the outside sensors. In general, the fields of view around the periphery have a lower defocus detecting capability due to the above two factors. A lengthwise direction of a field of view of a sensor (up and down direction in FIG. 10) means a direction in which sensor elements are disposed or a direction in which a phase difference is detected.

Accordingly, when a lens having a long focal length is mounted, a pattern of projected auxiliary light can be easily detected at focus detecting points located at a center even if a large amount of defocus exists there. Conversely, even if auxiliary light is projected, it is difficult to detect the pattern thereof at focus detecting points located around the periphery in the up and down direction.

Therefore, the central regions U, C, and D are grouped into a group A and the peripheral regions T and B are grouped in a group B, the accumulation times of them are denoted by IntTime_A and IntTime_B, respectively, and whether or not auxiliary light is to be emitted is determined based on IntTime_A>Tref_A, IntTime_B>Tref_B, and Tref_A<Tref_B, which is similar to the first example. As a result, auxiliary light can be easily projected at the focus detecting points in the group A located at the center of the screen, and wasteful projection of auxiliary light can be reduced at the focus detecting points in the periphery thereof.

Figure 11:
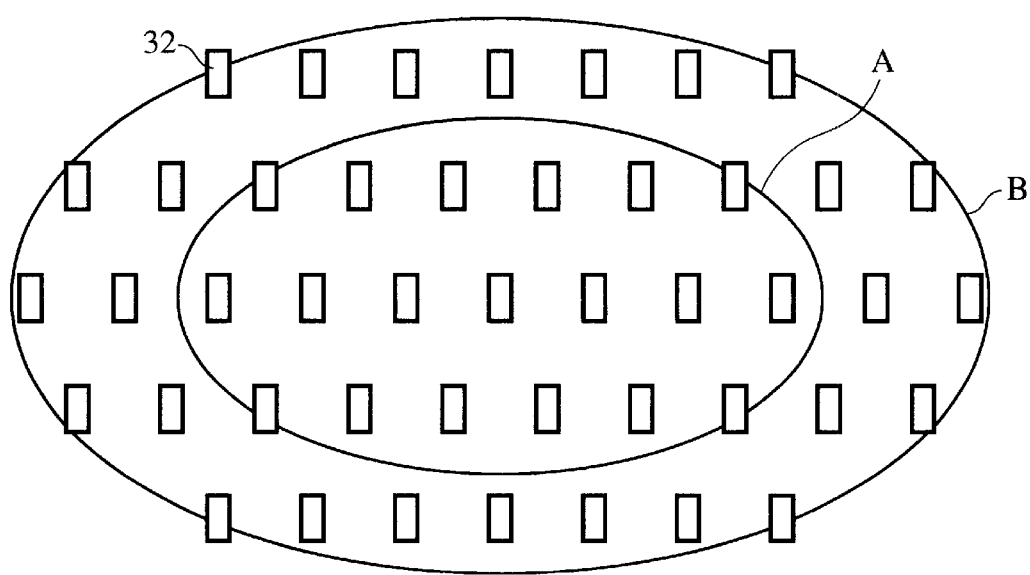
FIG. 11 is a view showing still another example of grouping of the focus detecting points shown in FIG. 3.

FIG. 11 shows a third example of the method of grouping the auxiliary light emission threshold values of the plurality of focus detecting points in the photographing screen.

Reference symbol A denotes a group of focus detecting points located at the center of an auxiliary light projecting range, and reference symbol B denotes a group of focus detecting points located around the periphery of the auxiliary light projecting range. Auxiliary light emitted is brightest at the center which is located on an optical axis and a pattern is clearly projected thereat, and the quantity of the auxiliary light is gradually reduced toward the periphery and the pattern is curved by aberration. Thus, the performance of the auxiliary light is high at the center and reduced toward the periphery. Therefore, unless a degree of luminance of the subject is sufficiently lowered around the periphery, an effect of an auxiliary light pattern is difficult to be obtained, whereas, a focus detecting accuracy can be sufficiently increased on the optical axis even if the subject has a somewhat high degree of luminance because auxiliary light has a high performance. Thus, the focus detecting points at the center of the photographing screen are grouped to a group A, and the focus detecting points around the periphery thereof are grouped into a group B which is located on the outside of the group A.

When the accumulations times of the respective groups are denoted by IntTime_A and IntTime_B and whether or not auxiliary light is to be emitted is determined based on IntTime_A>Tref_A, IntTime_B>Tref_B, and Tref_A<Tref_B, auxiliary light can be easily projected at the focus detecting points of the group A at the center of the screen, and wasteful projection of auxiliary light can be reduced at the focus detecting points around the periphery of the screen.

While the groups A and B have the different auxiliary light emission threshold values in the above embodiments, when focus detecting points have wide intervals, all of them may have a different auxiliary light projection threshold value.

Figure 12:
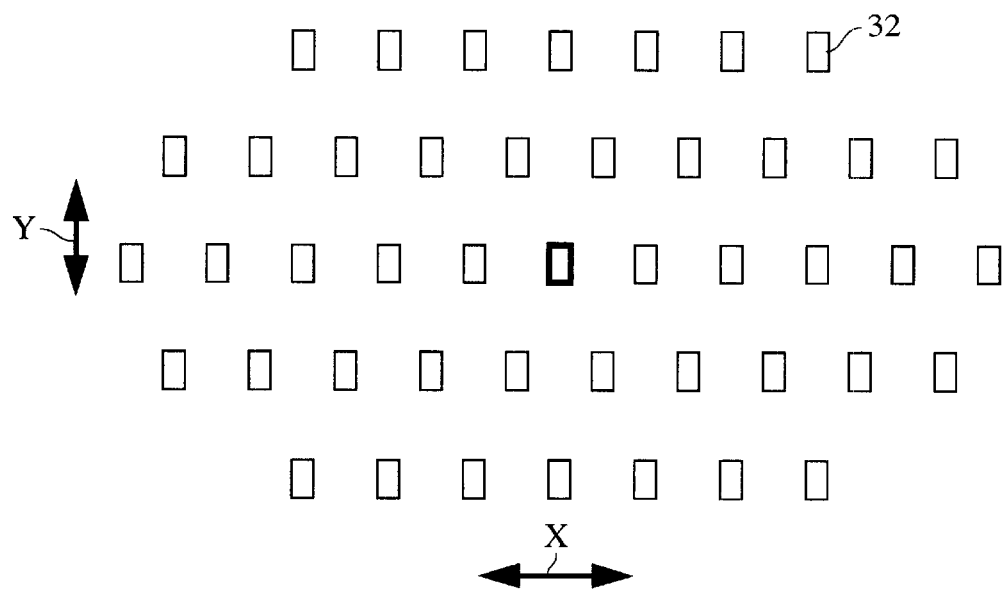
FIG. 12 is a view showing an example of a moving direction of a focus detecting point selection unit in the present invention.
Figure 13A:
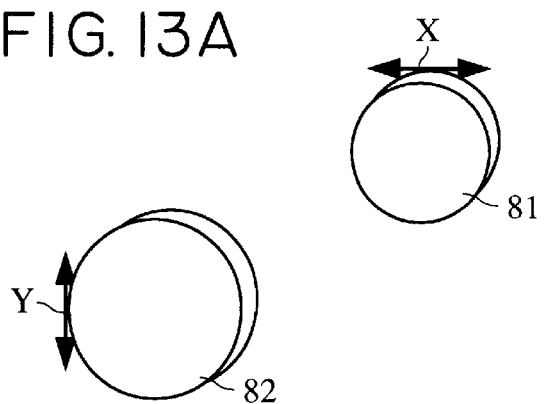
FIGS. 13A and 13B are views showing examples of an arrangement of the focus detecting point selection unit in the present invention.
Figure 13B:
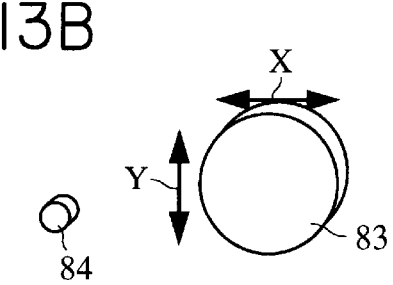

FIGS. 12, 13A, and 13B illustrate a method of selecting focus detecting points. FIG. 12 shows 45 focus detecting points 32, wherein a horizontal moving direction is shown by an X-direction and a vertical moving direction is shown by a Y-direction, and FIG. 13A shows a method of selecting a focus detecting point by operation members 81 and 82, which correspond to the respective moving directions. FIG. 13B shows a method of selecting the 45 focus detecting points by an operation member 83 for moving a focus detecting point to be selected and a button 84 for switching a direction selected by the operation member 83 between the X-direction and the Y-direction. Note that when any one of the groups A and B is selected, two button switches or two changeover switches may be employed as a means for selecting them.

Further, while the threshold values are set to the accumulation times of the sensors, threshold values may be set to characteristics values showing the characteristics of sensor outputs such as the contrast, amplifier gain, and the like of the sensor outputs and used as a reference for determining emission of auxiliary light.

Figure 14:
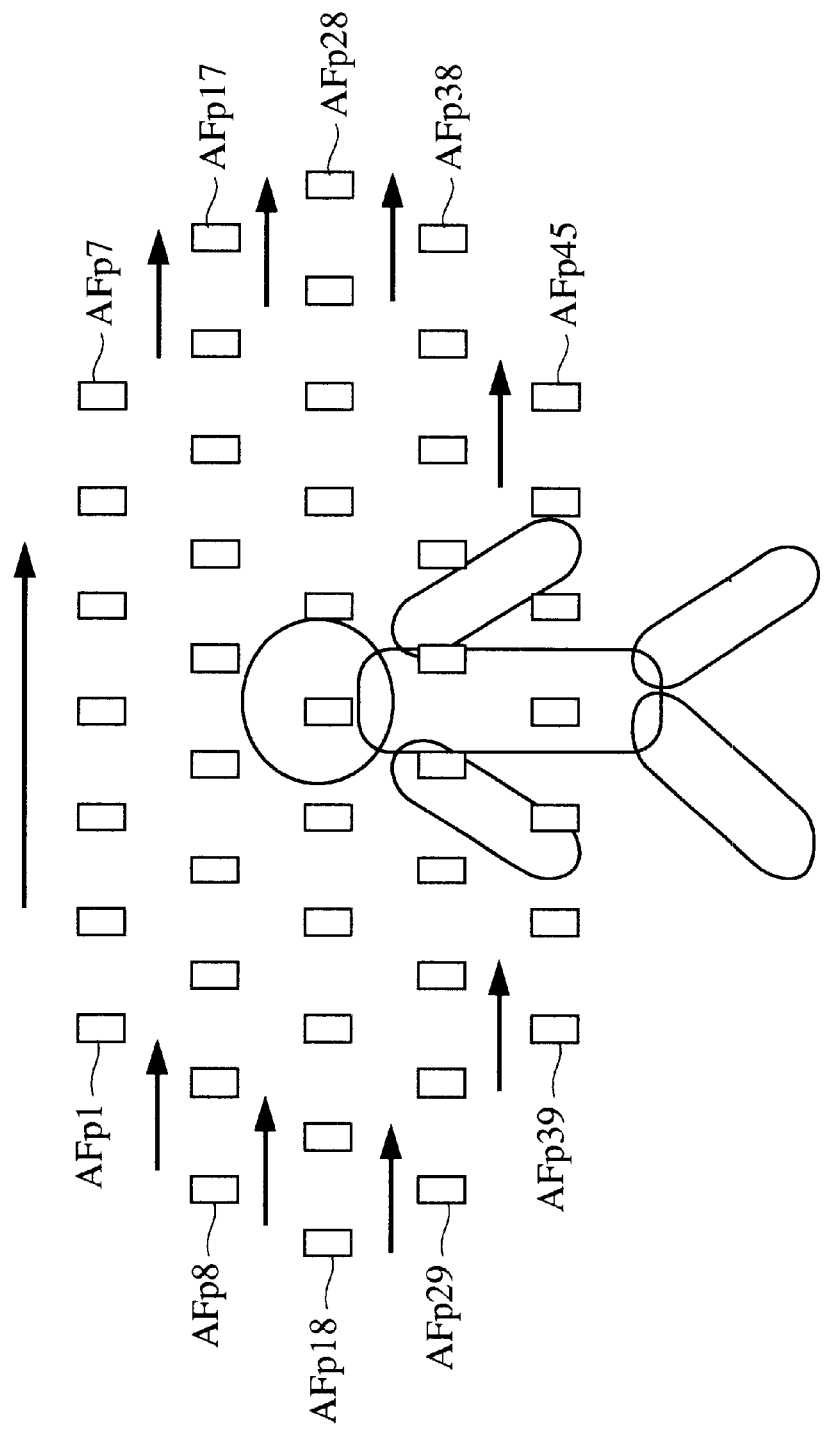
FIG. 14 is a view showing focus detecting points in an automatic mode in the present invention.

While the embodiments explained with reference to the aforementioned figures describe an optional selection mode in which an optional focus detecting point is selected by the focus detecting point selection unit, an embodiment described hereinafter has a mode selection unit (specifically, one of the switches SWS of FIG. 1) capable of selecting any one of two modes, that is, the above optional selection mode and an automatic selection mode in which a focus detecting point is automatically selected by an automatic selection unit. FIG. 14 shows the embodiment in which the automatic selection mode is selected by the mode selection unit.

Reference symbols AFp1 to AFp45 show 45 focus detecting points. When the quantities of defocus at the respective focus detecting points are denoted by Def1 to Def45, the automatic selection unit selects a focus detecting point that exhibits a relatively most positive quantity of defocus of the 45 amounts of defocus Def1 to Def45. With this operation, a focus adjustment operation can be executed by selecting a subject positioned nearest to a photographer without being influenced by a background.

However, when a focus cannot be detected by the automatic selection unit in the automatic selection mode because a subject has a low degree of luminance, it is difficult to set an auxiliary light emission threshold value to an appropriate value because a focus detecting point cannot be determined.

To cope with this problem, in the automatic selection mode, the auxiliary light emission threshold value is set to a lowest value (a fixed value common to respective detecting points) in the optional selection mode of a focus detecting point. With this arrangement, auxiliary light can be easily emitted even if a subject is located at any position, and a focus detecting accuracy similar to that in the optional selection mode can be realized.

Note that while FIG. 1 shows that the camera is arranged independently of the lens (the lens can be replaced), the present invention also can be applied to a lens built-in camera without any problems and further is not limited thereto.

The present invention also is applicable to observation devices such as a telescope, binoculars, a microscope, and the like having a plurality of focus detecting points on a field of view screen or on an observation screen, in addition to the camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An auxiliary light emitting device for a focus detecting device for emitting an auxiliary light, the focus detecting device having a plurality of focus detecting areas, the focus detecting device respectively detecting a focus of a subject in the plurality of focus detecting areas, said auxiliary light emitting device comprising:

a determination circuit for determining whether the auxiliary light is to be emitted based on a determination condition, wherein the determination condition used for the determination is a different predetermined condition in accordance with the position of a focus detecting area for at least two of the plurality of focus detecting areas, the different predetermined condition using a respective different predetermined value.

2. An auxiliary light emitting device for a focus detecting device for emitting an auxiliary light, the focus detecting device having a plurality of focus detecting areas, the focus detecting device respectively detecting a focus of a subject in the plurality of focus detecting areas, said auxiliary light emitting device comprising:

a determination circuit for determining whether the auxiliary light is to be emitted based on a determination condition, wherein the determination condition, which is different in accordance with the position of a focus detecting area, is used for the determination in at least two of the plurality of focus detecting areas, wherein the plurality of focus detecting areas are grouped into an upper region and a lower region in a field of view, and wherein the determination condition is a different predetermined condition for a focus detecting area of the upper region and a focus detecting area of the lower region.

3. An auxiliary light emitting device according to claim 1, wherein the plurality of focus detecting areas are grouped into a region at a center in a field of view and a region about a periphery of the center, and wherein the determination condition is a different predetermined condition for a focus detecting area of the region at the center and a focus detecting area of the region about the periphery of the center.

4. An auxiliary light emitting device according to claim 1, wherein each of the plurality of focus detecting areas includes respective photoelectric conversion means having a field of view, and wherein the determination condition is a condition which corresponds to a length of the field of view of the photoelectric conversion means.

5. An auxiliary light emitting device for a focus detecting device for emitting an auxiliary light, the focus detecting device having a plurality of focus detecting areas, the focus detecting device respectively detecting a focus of a subject in the plurality of focus detecting areas, said auxiliary light emitting device comprising:

a selection circuit for selecting at least one of the plurality of focus detecting areas; and a setting circuit for setting an auxiliary light emission determination condition to use a predetermined value selected in accordance with the focus detecting area selected by said selection circuit, the auxiliary light emission determination condition being a criterion for determining whether the auxiliary light is to be emitted.

6. An auxiliary light emitting device for a focus detecting device for emitting an auxiliary light, the focus detecting device having a plurality of focus detecting areas, the focus detecting device respectively detecting a focus of a subject in the plurality of focus detecting areas, said auxiliary light emitting device comprising:

a selection circuit for selecting at least one of the plurality of focus detecting areas; and a setting circuit for setting an auxiliary light emission determination condition in accordance with the focus detecting area selected by said selection circuit, the auxiliary light emission determination condition being a criterion for determining whether the auxiliary light is to be emitted, wherein the plurality of focus detecting areas are grouped into an upper region and a lower region in a field of view, and said setting circuit sets the auxiliary light emission determination condition for each of the upper and lower regions to a different predetermined condition.

7. An auxiliary light emitting device for a focus detecting device for emitting an auxiliary light, the focus detecting device having a plurality of focus detecting areas, the focus detecting device respectively detecting a focus of a subject in the plurality of focus detecting areas, said auxiliary light emitting device comprising:

a selection circuit for selecting at least one of the plurality of focus detecting areas; and a setting circuit for setting an auxiliary light emission determination condition in accordance with the focus detecting area selected by said selection circuit, the auxiliary light emission determination condition being a criterion for determining whether the auxiliary light is to be emitted, wherein the plurality of focus detecting areas are grouped into a region at a center in a field of view and a region about a periphery of the center, and said setting circuit sets the auxiliary light emission determination condition for each of the region at the center and the region about the periphery of the center to a different predetermined condition.

8. An auxiliary light emitting device according to claim 5, wherein each of the plurality of focus detecting areas includes respective photoelectric conversion means having a field of view, and said setting circuit sets the auxiliary light emission determination condition based on a length of the field of view of the photoelectric conversion means.

9. A focus detecting device comprising:

a plurality of focus detecting areas;

a selection circuit having modes including (i) an optional selection mode for selecting an optional focus detecting area, and (ii) an automatic selection mode for automatically selecting at least one of the plurality of focus detecting areas;

a setting circuit for setting, (i) in the optional selection mode, determination criteria to values according to the plurality of focus detecting areas, respectively, and a selected determination criterion to the determination criterion value for the focus detecting area selected by said selection circuit, and (ii) in the automatic selection mode, the selected determination criterion to a lowest of the determination criteria values in the optional selection mode; and a determination circuit for determining whether auxiliary light is to be emitted based on the selected determination criterion.

10. A focus detecting device having an auxiliary light mode, in which, when a focus is not appropriately first detected, a focus detecting operation for detecting the focus is executed with auxiliary light being projected, said focus detecting device comprising:

a plurality of focus detecting areas;

a detecting circuit which detects a focus in each of the plurality of focus detecting areas; and a determination circuit for determining whether the focus detecting operation is to be executed in the auxiliary light mode with auxiliary light being projected based on a determination criterion, wherein the determination criterion is set to a different predetermined value according to the focus detecting area.

11. A focus detecting device according to claim 10, wherein the plurality of focus detecting areas are divided into a plurality of groups each having at least two of the plurality of focus detecting areas, and the determination criterion is set to a different predetermined value for each of the plurality of groups.

12. A focus detecting device according to claim 10, further comprising a selection circuit for selecting at least one of the plurality of focus detecting areas, wherein said determination circuit determines whether the focus detecting operation is to be executed in the auxiliary light mode based on the determination criterion set for the focus detecting area selected by said selection circuit.

13. A focus detecting device according to claim 11, further comprising a selection circuit for selecting at least one of the plurality of focus detecting areas, wherein said determination circuit determines whether the focus detecting operation is to be executed in the auxiliary light mode based on the determination criterion set for the group to which the focus detecting area selected by said selection circuit belongs.

14. A focus detecting device having an auxiliary light mode, in which, when a focus is not appropriately first detected, a focus detecting operation for detecting the focus is executed with auxiliary light being projected, said focus detecting device comprising:

a plurality of focus detecting areas;

a detecting circuit which detects a focus in each of the plurality of focus detecting areas; and a determination circuit for determining whether the focus detecting operation is to be executed in the auxiliary light mode based on a determination criterion, wherein the determination criterion is set to a different predetermined value according to the focus detecting area, wherein the plurality of focus detecting areas are divided into a plurality of groups each having at least two of the plurality of focus detecting areas, and the determination criterion is set to a different predetermined value for each of the plurality of groups, and wherein the plurality of groups includes an upper group and a lower group, the upper group includes the focus detecting areas positioned at an upper portion of a screen, the lower group includes the focus detecting areas positioned under the upper group, and the determination criterion for the upper group is set to a different predetermined value than that of the determination criterion for the lower group.

15. A focus detecting device according to claim 14, wherein the determination criterion of the lower group is set so that the auxiliary light mode can be selected even though the auxiliary light mode would not be selected based on the determination criterion of the upper group.

16. A focus detecting device according to claim 10, wherein each of said plurality of focus detecting areas includes respective photoelectric conversion means having a field of view, and the determination criterion is set based on a length of the field of view of at least one of the photoelectric conversion means.

17. A focus detecting device having an auxiliary light mode, in which, when a focus is not appropriately first detected, a focus detecting operation for detecting the focus is executed with auxiliary light being projected, said focus detecting device comprising:

a plurality of focus detecting areas;

a detecting circuit which detects a focus in each of the plurality of focus detecting areas; and a determination circuit for determining whether the focus detecting operation is to be executed in the auxiliary light mode based on a determination criterion, wherein the determination criterion is set to a different predetermined value according to the focus detecting area, and wherein the plurality of focus detecting areas includes an upper focus detecting area and a lower focus detecting area, the upper focus detecting area includes the focus detecting areas positioned at an upper portion of a screen, the lower focus detecting area includes the focus detecting areas positioned under the upper focus detecting area, and the determination criterion for the upper focus detecting area is set to a different predetermined value than that of the determination criterion for the lower focus detecting area.

18. A focus detecting device according to claim 17, wherein the determination criterion of the lower focus detecting area is set so that the auxiliary light mode can be selected even though the auxiliary light mode would not be selected based on the determination criterion of the upper focus detecting area.

19. A focus detecting device according to claim 10, wherein the plurality of focus detecting areas includes a peripheral focus detecting area and an inner focus detecting area, the peripheral focus detecting area includes the focus detecting areas positioned around a periphery of a screen, the inner focus detecting area includes the focus detecting areas not included in the peripheral focus detecting area, and the determination criterion for the peripheral focus detecting area is set to a different predetermined value than that of the determination criterion for the inner focus detecting area.

20. A focus detecting device having an auxiliary light mode, in which, when a focus is not appropriately first detected, a focus detecting operation for detecting the focus is executed with auxiliary light being projected, said focus detecting device comprising:

a plurality of focus detecting areas;

a detecting circuit which detects a focus in each of the plurality of focus detecting areas; and a determination circuit for determining whether the focus detecting operation is to be executed in the auxiliary light mode based on a determination criterion, wherein the determination criterion is set to a different predetermined value according to the focus detecting area, wherein the plurality of focus detecting areas includes a peripheral focus detecting area and an inner focus detecting area, the peripheral focus detecting area includes the focus detecting areas positioned around a periphery of a screen, the inner focus detecting area includes the focus detecting areas not included in the peripheral focus detecting area, and the determination criterion for the peripheral focus detecting area is set to a different predetermined value than that of the determination criterion for the inner focus detecting area, and wherein the determination criterion of the inner focus detecting area is set so that the auxiliary light mode can be selected even though the auxiliary light mode would not be selected based on the determination criterion of the peripheral focus detecting area.

21. A camera comprising:

a focus detecting device including a plurality of focus detecting areas, said focus detecting device detecting a focus in each of the plurality of focus detecting areas, and having a first selection mode for selecting at least one of the plurality of focus detecting areas by manual selection of an operator and a second selection mode for automatically selecting at least one of the plurality of focus detecting areas;

a setting circuit for setting, (i) in the first selection mode, a selected determination criterion to a determination criterion value according to a selected focus detecting area, and (ii) in the second selection mode, the selected determination criterion to a fixed criterion; and an auxiliary light mode setting circuit for determining, based on the selected determination criterion, whether to execute a focus detecting operation with auxiliary light being projected, and for executing the focus detecting operation with the auxiliary light being projected.

22. An apparatus comprising:

an auxiliary light emitter;

first photoelectric conversion means corresponding to a first focus detection point;

second photoelectric conversion means corresponding to a second focus detection point;

selection means for selecting a focus detection point; and control means for controlling said auxiliary light emitter in accordance with a comparison between a first threshold value and an output of said first photoelectric conversion means when said selection means selects the first focus detection point, and for controlling said auxiliary light emitter in accordance with a comparison between a second threshold value and an output of said second photoelectric conversion means when said selection means selects the second focus detection point, wherein the first threshold value and the second threshold value are different.

23. An apparatus according to claim 22, wherein the first and second focus detection points have different defocus detecting capability.

24. An apparatus according to claim 23, wherein the first focus detection point has a lower defocus detecting capability than the second focus detection point, and the first threshold value is greater than the second threshold value.

25. An apparatus according to claim 22, wherein the first and second focus detection points respectively correspond to a first position on a photographing screen and a second position on the photographing screen located below the first position.

26. An apparatus according to claim 22, wherein the first and second focus detection points respectively correspond to a first position on a photographing screen and a second position on the photographing screen located peripheral to the first position.

27. An apparatus according to claim 22, wherein the output of the first photoelectric conversion means is an accumulation time, and the output of the second photoelectric conversion means is an accumulation time.

28. An apparatus according to claim 22, wherein said selection means is manually operated.

29. An apparatus according to claim 22, wherein said selection means is automatic.

30. An apparatus according to claim 22, wherein said auxiliary light emitter projects light on a subject and focus detection is performed while the light is projected on the subject.

31. A method comprising:

projecting auxiliary light in accordance with a first value and photoelectric conversion output corresponding to a first focus detection point when the first focus detection point is selected, and in accordance with a second value and photoelectric conversion output corresponding to a second focus detection point when the second focus detection point is selected, wherein the first and second values are different.

32. A method according to claim 31, wherein the first and second values are threshold values, and wherein the photoelectric conversion outputs corresponding to the first and second focus detection points are accumulation times.

* * * * *